US008787835B2

(12) United States Patent
Verger et al.

(10) Patent No.: US 8,787,835 B2
(45) Date of Patent: Jul. 22, 2014

(54) FORCED CELL OR RADIO ACCESS TECHNOLOGY RESELECTION RESPONSIVE TO NETWORK ACCESS BARRING

(71) Applicant: Apple Inc., Cupertino, CA (US)

(72) Inventors: Luciano M Verger, Santa Clara, CA (US); Srinivasan Vasudevan, Sunnyvale, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/630,496

(22) Filed: Sep. 28, 2012

(65) Prior Publication Data
US 2014/0018075 A1    Jan. 16, 2014

Related U.S. Application Data

(60) Provisional application No. 61/671,295, filed on Jul. 13, 2012.

(51) Int. Cl.
*H04W 88/02*    (2009.01)

(52) U.S. Cl.
USPC ....................................... 455/67.11

(58) Field of Classification Search
USPC ............ 455/67.11, 450, 411, 418, 434, 437, 455/500, 553.1, 575.2; 370/310, 338, 329, 370/330, 328
See application file for complete search history.

(56) References Cited

U.S. PATENT DOCUMENTS

| 8,265,035 | B2 | 9/2012 | Du et al. |
| 2008/0084272 | A1 | 4/2008 | Modiano |
| 2008/0200146 | A1 | 8/2008 | Wang et al. |
| 2011/0188396 | A1* | 8/2011 | Jung et al. ...................... 370/252 |
| 2011/0199905 | A1 | 8/2011 | Pinheiro et al. |
| 2012/0281566 | A1* | 11/2012 | Pelletier et al. ............... 370/252 |
| 2013/0223409 | A1* | 8/2013 | Jung et al. ...................... 370/331 |

* cited by examiner

*Primary Examiner* — Diane Mizrahi
(74) *Attorney, Agent, or Firm* — Meyertons, Hood, Kivlin, Kowert & Goetzel, P.C.

(57) ABSTRACT

A method and apparatus for forced cell/RAT reselection is disclosed. In one embodiment, a cellular mobile communication device may attempt to access a network through a serving cell. Responsive to determining that access to the network is barred through the serving cell, the mobile communication device may determine if another cell is available through which it may obtain access to the network. If another cell providing network access is available, the mobile communication device may force reselection from the serving cell to the new cell. If no other cell providing access to the network is available to the mobile communication device, a forced reselection of a radio access technology may be performed.

9 Claims, 5 Drawing Sheets

FORCED CELL OR RADIO ACCESS TECHNOLOGY RESELECTION RESPONSIVE TO NETWORK ACCESS BARRING

PRIORITY INFORMATION

This application claims priority to U.S. provisional patent application Ser. No. 61/671,295, entitled "Forced Cell or Radio Access Technology Reselection Responsive to Network Access Barring", filed Jul. 13, 2012, and which is hereby incorporated by reference in its entirety as though fully and completely set forth herein.

BACKGROUND

1. Technical Field

This disclosure is directed to cellular communication systems, and more particularly, to methods of operating a mobile communications device with a network in a cellular communications system.

2. Description of the Related Art

Wireless communication systems are rapidly growing in usage. Further, wireless communication technology has evolved from voice-only communications to also include the transmission of data, such as Internet and multimedia content. In the evolution of wireless communications systems, different standards have evolved. The 3G and 4G (also referred to at LTE, or Long Term Evolution) standards are two recent standards, with the latter providing greater communication bandwidth than the former. Additional standards, such as the 5G standard, are presently in development and may provide yet even greater wireless communication bandwidth.

With the advent of higher bandwidth standards, various methods may be employed to control and manage traffic on the networks for which these standards are deployed. For example, the LTE standard allows for access barring, which may provide admission control to an LTE network. More particularly, when access barring is enabled, some percentage of LTE connection attempts (by mobile devices enabled for LTE communications) are delayed. This may enable an LTE network to better manage and control traffic and bandwidth allocation.

SUMMARY

Various method and apparatus embodiments for forcing cell or radio access technology reselection responsive to access barring are disclosed. In one embodiment, a mobile communications device (e.g., a smart phone) is a cellular device configured for communications with various networks in various cells. The mobile communications device may use a given radio access technology (RAT) during communications with a particular network in the cell currently serving the device (hereinafter 'the serving cell'). For some networks, access barring may be implemented, wherein an attempted radio resource control (RRC) connection can be significantly delayed before being granted, which can adversely affect the user experience. Responsive to determining that access to a given network is barred in a currently serving cell, the mobile communication device may determine if another cell providing access to the same network is available. If another cell is available, the mobile communication device may force cell reselection to the new cell in order to gain access to the network. If no other cell providing access to the network is available, the mobile communication device may force a RAT reselection.

In one embodiment, a mobile communications device may be configured for communications with a Long Term Evolution (LTE) network and a universal mobile telecommunication system (UTMS) network. A baseband unit in the UE may cause a corresponding transceiver to transmit signals in an attempt to obtain access to the LTE network through a first base station. The first base station corresponds to the current serving cell. If the baseband unit determines that access to the LTE network is barred through the first base station, it may cause the baseband to scan for LTE neighbor cells. If a second base station in the area supporting LTE is available, the baseband unit may force cell reselection and attempt to establish a link with the LTE network through the second base station, even though cell reselection criteria has not otherwise been met. If access to the LTE network is not available through a neighboring cell, then the baseband unit may wait until a timer in the first base station has expired and may again attempt access thereafter. If an attempt to access the LTE network through the second base station is unsuccessful, the baseband unit may scan neighboring cells to determine if any support another radio access technology (RAT) of the mobile communication device. If such a base station is found, the baseband unit may cause the transceiver to attempt access to another radio access network (RAN) using the alternate RAT. Otherwise, the baseband unit may wait until the timer expires in the first base station and re-attempt access to the LTE network.

BRIEF DESCRIPTION OF THE DRAWINGS

The following detailed description makes reference to the accompanying drawings, which are now briefly described.

Figure 1A:
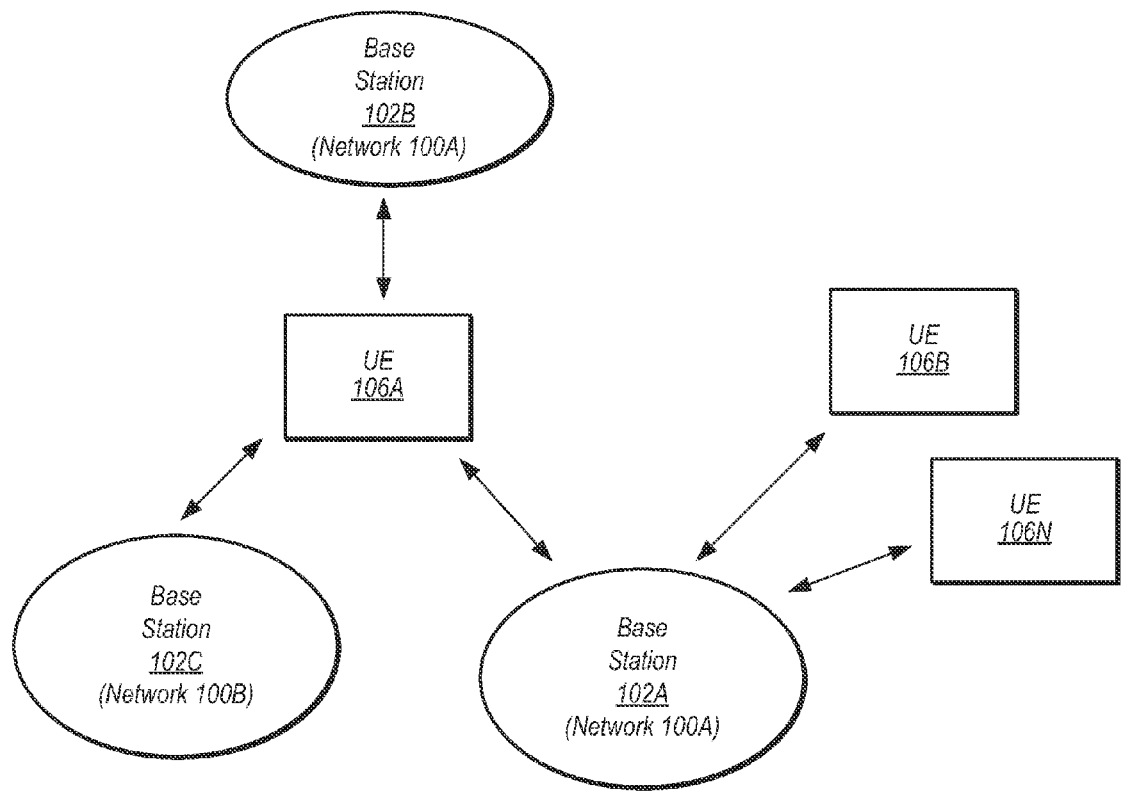
FIG. 1A illustrates an exemplary wireless communication system.

While the disclosure is susceptible to various modifications and alternative forms, specific embodiments thereof are shown by way of example in the drawings and will herein be described in detail. It should be understood, however, that the drawings and detailed description discussed below are not intended to be limiting to the particular form disclosed, but on the contrary, to cover all modifications, equivalents and alternatives falling within the spirit and scope of the disclosed method and apparatus, as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Acronyms

The following acronyms are used in the present Patent Application:
BLER: Block Error Rate (same as Packet Error Rate)
BER: Bit Error Rate
BS: Base Station
CRC: Cyclic Redundancy Check
CSF: Channel State Feedback
DTX: Discrete Transmission
DL: Downlink
LTE: Long Term Evolution (4G)
PER: Packet Error Rate
RAN: Radio Access Network
RAT: Radio Access Technology
RRC: Radio Resource Control
SINR: Signal to Interference-and-Noise Ratio
SIR: Signal to Interference Ratio
SNR: Signal to Noise Ratio
SRLTE: Single Radio LTE
Tx: Transmission
UE: User Equipment
UL: Uplink
UMTS: Universal Mobile Telecommunication System Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—Any of various types of computing or processing systems, including a personal computer system (PC), mainframe computer system, workstation, network appliance, Internet appliance, personal digital assistant (PDA), television system, grid computing system, mobile phone, smart phone, laptop computer, tablet computer, or other device or combinations of devices. In general, the term "computer system" can be broadly defined to encompass any device (or combination of devices) having at least one processor that executes instructions from a memory medium.

User Equipment (UE) (or "UE Device")—Any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, tablet computers supporting wireless access (e.g., iPad™) personal digital assistants (PDAs), portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication, and is not limited to those explicitly disclosed herein.

Automatically—Refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Network—In general, a network may be defined a system of interconnected agents. The agents may include end-user computer system, servers, various wireless devices, telephones, and so forth. A network as defined herein may include a cellular network, which is a radio network made up of a number of cells (see definition below) each served by at least one base transceiver station, and which may provide wireless connectivity to wireless devices, and may also provide connectivity to other networks not directly served by the base transceiver stations in the respective cells.

Access Barring—A methodology by which a network controls access thereto through a base station supporting that network. A network in which access barring is implemented may reject a certain number of connection requests as a means of managing and controlling network traffic. When access is barred to a given device, a connection request is rejected, and access to the network through that base station may be barred for that device for a predetermined time period.

Cell—A geographic area covered by a base transceiver station. It is noted that cells may overlap one another, and thus a UE within an overlapping area may communicate through either cell via their respective base transceiver stations.

Serving Cell—A cell in which the UE has an established communications link or may attempt to establish a communication link to a network. The cell may be supported by a respective base transceiver station providing access to one or more different networks. A UE may connect to a given network supported by a base station of a given cell if it is within the geographic area served by that base station and implements a corresponding RAT. For example, if the base station provides access to an LTE network within its corresponding cell, a UE implementing the RAT for LTE access may be able to access the LTE network through that base station (and thus in that cell).

Neighbor Cell—A cell nearby a current serving cell. A neighbor cell may be supported by a base station that is not co-located with the base station of the serving cell. When a UE is within a geographic area overlapped by the serving cell and a neighbor cell, it may communicate with the base stations of either one. Furthermore, a UE in a geographic area overlapped by the serving cell and two or more neighbor cells may establish communicate with the base stations of any of the serving cell and the neighbor cells.

Communications Range—A distance between a UE and a base station in which two-way communications between the UE (and more particularly, a transceiver of the UE) and the base station can be support. Communications range may further be defined as being within a cell/geographic area supported by a particular base station. It is noted that, since cells may overlap, a UE may at certain times be within two or more different cells, and further, may be within communications range of two or more different base stations that are not co-located. Circuitry within a UE may determine if a base station is within communications range based on various factors, such as strength of signals received therefrom.

Network—A radio access network (RAN), e.g., LTE/4G, 3G, 2G, CDMA, CDMA 2000, WiFi, UTMS, etc.

Radio—A transceiver in a mobile device used to transmit signals to and receive signals from other equipments, such as transceivers in a base transceiver station.

Overview:

The present disclosure is directed toward method and apparatus embodiments in which cell reselection is forced when access to a network by a cellular mobile communication device, or UE, through a serving cell is barred. In one embodiment, when access to a network is barred through a serving cell but is available through a neighboring cell, the UE may force reselection to the neighboring cell. If an alternate cell is not available, the UE may force reselection of a RAT to communicate with another network if another cell supporting a UE-supported RAT is found.

In one embodiment, the UE may implement a RAT to support communications with a UMTS network and a RAT to support communications with an LTE network. The LTE network may support access barring. If the UE attempts to establish a connection to the LTE network through a current serving cell, and access thereto is barred, it may determine if an alternate cell is available to provide access to the LTE network. If access to the LTE network is available through the alternate cell, the UE may force cell reselection, thereby obtaining LTE network access through the alternate cell. If no alternate cell is available to provide access to the LTE network, the UE may scan for a UMTS cell and force reselection of the RAT to UMTS. Upon reselecting the RAT to UMTS, the mobile communication device may attempt to access the UMTS network through the available cell to which UMTS access may be obtained.

As noted above, LTE networks support access barring. Access Barring as means to provide admission control to the LTE network. When Access Barring is enabled, some percentage of LTE connection attempts will be significantly delayed (e.g., in one example, the delay may be 82 seconds). This in turn may negatively impact the user experience for a user of a mobile communication device. For example, a user of a UE may open an Internet browser application, thereby causing the UE to attempt to gain access to the LTE network. If access is barred and the UE is not equipped for cell/RAT reselection, the delay imposed by access barring may result in a significant wait time for the user to obtain the desired information. The method and apparatus embodiments disclosed herein may alleviate the impact by forcing a cell or RAT reselection.

In an LTE network, the UE may attempt to initiate RRC connection establishment following the 3GPP Spec 36.331, Section 5.3.3. This section outlines the procedure to follow, and describes functioning of access barring. Access barring is enabled if ac-BarringInfo IE is present in SystemInformationBlockType2 (SIB2). There are different RRC Connection Establishments Causes, among them:

Mobile Terminating calls: UE is paged and has to establish the connection (EstablishmentCause=mt−access).

Emergency calls: UE needs to establish RRC Connection for an emergency call (EstablishmentCause=emergency).

Mobile Originating calls: UL data becomes available (EstablishmentCause=mo−data).

Mobile Originated signaling: UE has to perform Signaling Procedures, for instance Tracking Area Update (EstablishmentCause=mo−signaling).

The LTE network may implement various timers for use in access barring. A first timer, known as T303, indicates that access is barred while performing RRC connection establishment for mobile originating calls. Another timer, known as T305, indicates that access is barred while performing RRC connection establishment for mobile originating signaling. If one of these timers has started, access is barred for as long as they are running, limiting accessibility to LTE.

Upon initiation of a call to the LTE network, a UE may generate a random number. If the random number generated by the UE is greater than the ac-BarringFactor, then the UE would have to wait until the T303 time expires in order to be able to re-attempt RRC Connection Establishment procedure. This will significantly delay all mobile originated data transfer initiation, implying high impact on user experience. For instance, if a FaceTime™ call is about to be established from an iPhone™ and LTE access ends up being barred, the call attempt will fail, and the access will be blocked on LTE for some time. Call success rate is determined by ac-BarringFactor. For instance, if ac-BarringFactor=p90, 90% of the calls will be successful, while this implies 10% of calls will experience call establishment failures (i.e. access is barred). Some current network operator's configuration for barring would imply T303/T305 being in the order of 82 seconds. This results in the blocking of LTE access for 82 seconds.

The method and apparatus embodiments may resolve the access barring issue described above by forcing cell reselection to an LTE cell other than the current serving cell. This may be performed even though cell reselection criteria has not otherwise been met. If it is not possible to access to the LTE network via a cell other than the current serving cell, the UE may force RAT reselection and connect to another network via any available cell.

Figure 1B:
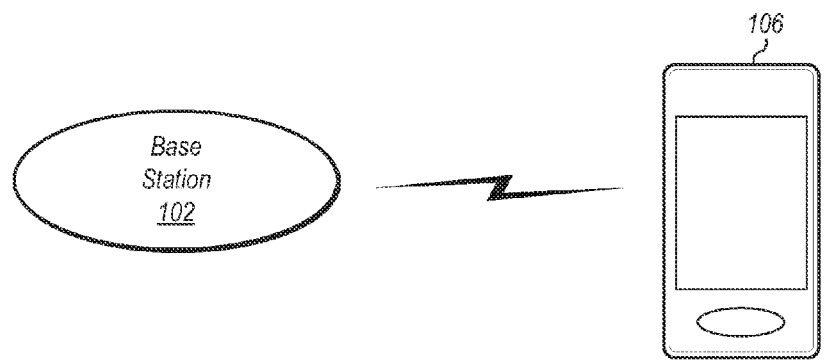
FIG. 1B illustrates a base station 102 in communication with user equipment (UE) 106.

FIGS. 1A and 1B—Communication System

FIG. 1A illustrates an exemplary (and simplified) wireless communication system. It is noted that the system of FIG. 1A is merely one example of a possible system, and embodiments may be implemented in any of various systems, as desired. As shown, the exemplary wireless communication system includes three base stations 102A, 102B, and 102C, each of which may communicate over a respective transmission medium with one or more User Equipment (UE) (or "UE devices") 106A through 106N.

The base stations 102A-102C may each be a base transceiver stations (BTS), and may include hardware that enables wireless communication with the UEs 106A through 106N. The base stations 102A and 102B are equipped to communicate with a network 100A, while base station 102C is equipped to communicate with network 100B. Embodiments are possible and contemplated wherein as least some base stations (e.g., base stations 102A and 102B) are co-located. If not co-located, base stations 102A-102C may be within the geographical vicinity of one another such that at least one of the UEs (UE 106A in this example) is within communications range of each of them from a given location. Generally, the base stations 102A, 102B, and 102C may facilitate communication between the UEs and/or between the UEs and the networks 100A and 100C, respectively. The communication areas (or coverage area) of the base station may be referred to as "cells." The base stations 102A-102CB and the UEs may be configured to communicate over the transmission medium using any of various wireless communication technologies to access networks such as GSM, CDMA, UMTS (WCDMA or TD-SCDMA), CDMA2000, WLL, WAN, WiFi, WiMAX, 2G, 3G, LTE, LTE-Advanced (LTE-A), etc. Each of the UE's may support one or more radio access technologies (RATs) to enable communications with BTS's providing access to corresponding radio access networks (RANs), including those noted above.

FIG. 1B illustrates UE 106 (e.g., one of the devices 106A through 106N) in communication with a base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein. The various methods described herein may also be performed using other types of hardware, software, or any combination thereof.

In some embodiments, the UE 106 may be configured to establish a link to a given network (e.g., an LTE network) through a base station supporting access to that network. UE 106 (which is discussed in further detail below) may also be configured to perform cell reselection based on various criteria. For example, if UE 106 is in motion, the strength of signals from a current serving cell may weaken over time as the UE 106 changes location. Responsive to the declining signals strength of incoming signals (or other criteria), UE 106 may initiate cell reselection. During cell reselection, the UE 106 may scan for signals from base station from one or more different cells. If another base station is found with a signal strength more suitable to supporting the current link to the network, UE 106 may initiate cell reselection. Thereafter, UE 106 may continue communications with the network through the new cell.

Some networks may support access barring in order to control network traffic. In the event that access is barred to a network in a current serving cell, UE 106 may determine whether there is a neighbor cell having a base station within communications range that also provides access to the same network. If such a neighbor cell is found, UE 106 may force cell reselection to the neighbor cell even though cell reselection criteria has not otherwise been met. After forcing cell reselection, UE 106 may attempt to access the network through the base station of the newly selected cell. If access is barred through that base station, UE 106 may search for yet another neighbor cell providing access to the network, and force cell reselection and attempt access if one is found. If no other neighbor cell providing access to the first network is within communications range, UE 106 may scan for other cells through which a link may be established according to a RAT supported by UE 106. For example, if the network to which access was barred is an LTE network, and UE 106 implements a RAT for communicating through a UTMS network, it may determine if any base stations providing UTMS access are within communications range. If so, UE 106 may force RAT reselection and attempt to access the UTMS network. If no other cells within communications range of UE 106 support an alternate RAT, then UE 106 may respect access barring in the currently serving cell, and may re-attempt access to the network after a predetermined time period has elapsed (e.g., as set by a time in the LTE network).

Figure 2:
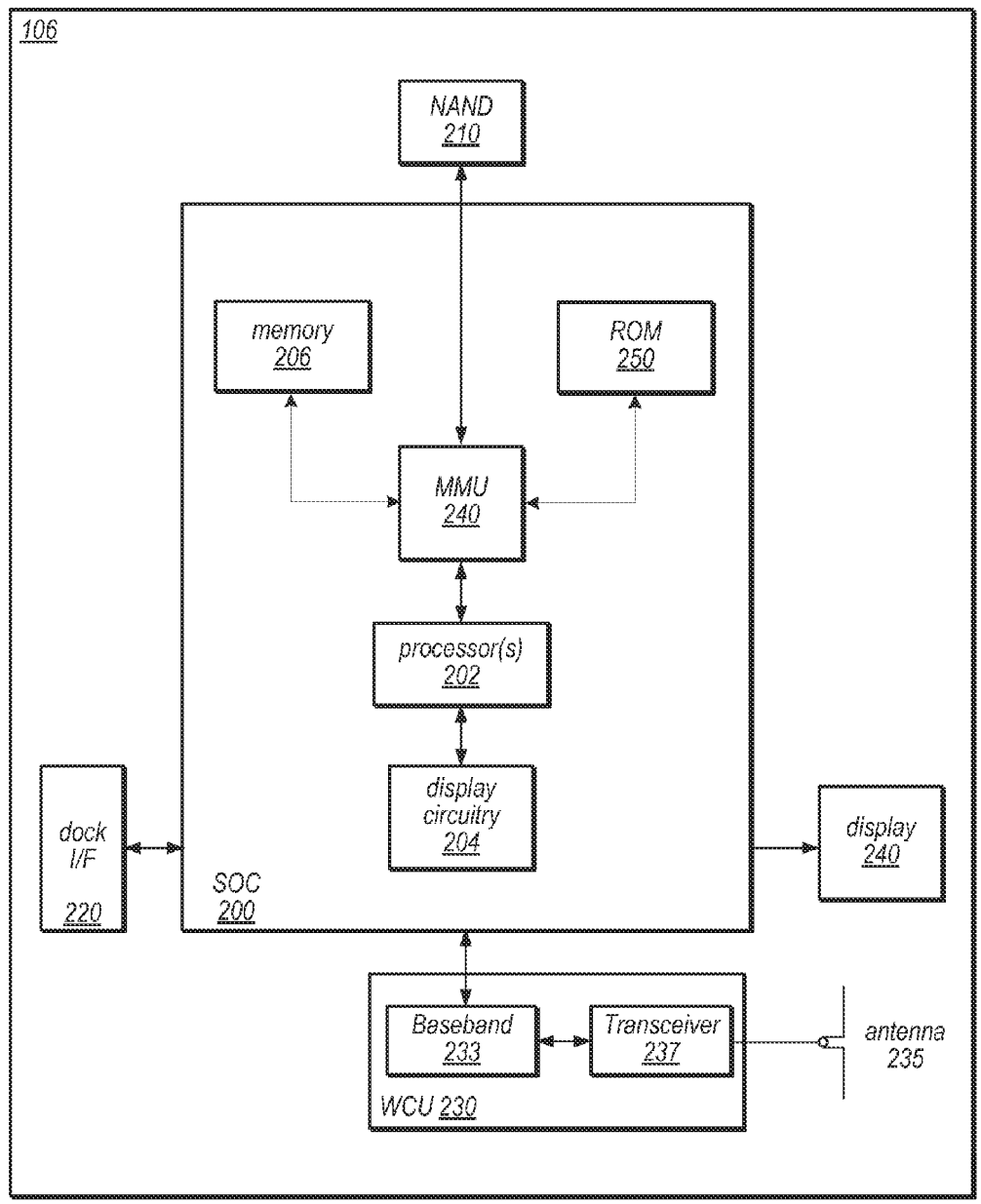
FIG. 2 illustrates an exemplary block diagram of a UE 106, according to one embodiment.

FIG. 2—Exemplary Block Diagram of a UE

FIG. 2 illustrates an exemplary block diagram of a UE 106. As shown, the UE 106 may include a system on chip (SOC) 200, which may include different functional units for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, wireless communications unit 230, connector I/F 220, and/or display 240. The MMU 240 may be configured to perform memory protection and page table translation or set up. In some embodiments, the MMU 240 may be included as a portion of the processor(s) 202.

As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communications unit (WCU) 230 (e.g., for LTE, 3G, CDMA, GSM, Bluetooth, WiFi, UMTS etc.) which may use antenna 235 to perform the wireless communication. WCU 230 in the embodiment shown includes a baseband unit 233 and at least one transceiver 237 for transmitting signals carrying outgoing traffic and receiving signals carrying incoming traffic. In one embodiment, a single transceiver may be used to communicate with multiple networks (e.g., LTE, 3G, UMTS and CDMA networks, among other types). In another embodiment, UE 106 may be a UMTS UE in which wireless communications unit 230 includes multiple transceivers. Transceiver 237 as shown in FIG. 2 may be representative of any of the embodiments discussed herein, and thus may be considered as a single transceiver or as implementing multiple transceivers.

The functions performed by baseband unit 233 may include cell selection/reselection and RAT selection/reselection. These functions may be implemented in hardware, firmware, or software instructions executing on processing circuitry within baseband unit 233. The functions may also include random number generation that may be performed during attempts to access certain networks (e.g., an LTE network) and for other situations in which random number generation may be employed, if random number generation is not otherwise performed in processor(s) 202. Cell reselection may be performed based on certain cell reselection criteria (e.g., such as strength of signals received from a base station of a currently serving cell, among other criteria). Baseband unit 233 as may in some cases override cell reselection criteria and thus force cell reselection in instances in which a requested connection to a network is prevented by access barring. It is noted that in some embodiments of a UE, functions lo performed by baseband unit 233 may instead be performed in a processor of SOC 200, and may be performed under software control.

Other functions included by baseband unit 233 may include processing of outgoing data sent to transceiver 237 and processing of incoming data received from transceiver 237. Modulation/demodulation functions may be performed in transceiver 237, which may utilize one or more modulation schemes, which may depend on the RAT currently in use. Transceiver 237 may also, under the direction of baseband unit 233, scan for base stations in cells other than the currently serving cell in search of other cells that provide access to a network using a RAT currently in use or to another network using a different RAT.

Figure 3:
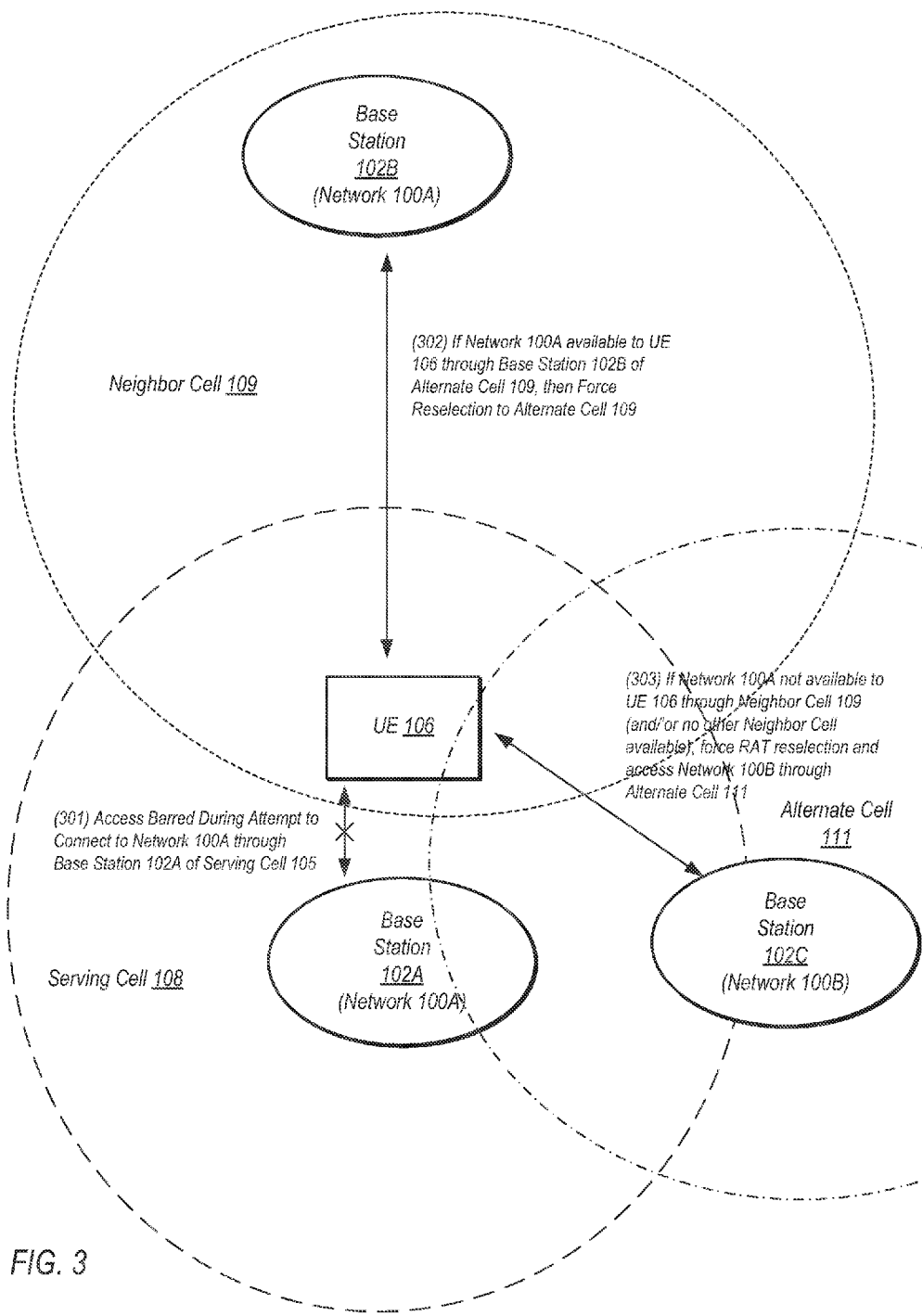
FIG. 3 is a diagram illustrating forced cell reselection and forced reselection of radio access technology (RAT) by UE 106 responsive to access barring.

Forced Cell/RAT Reselection:

Turning now to FIG. 3, a diagram illustrating one embodiment of performing forced cell/RAT reselection responsive to an access barring situation is shown. In the example shown, UE 106 is initially operating within serving cell 108, which is supported by base station 102A. Serving cell 108 is the cell through which communications are conducted with UE 106 at its current location. For example, if UE 106 originates a data call, or receives an incoming voice call, the transmission and reception of signals carrying the voice call information may be conveyed through base stations 102A of serving cell 108.

Base station 102A may support communications between UE 106 and network 100A. Neighbor cell 109 may also support communications between UE 106 and network 100A. Another cell (for which a corresponding base station is not shown), alternate cell 111 may support communications between UE 106 and network 100B. Networks 100A and 100B may be any of a number of different network types. For the purposes of this example, network 100A is considered to be an LTE network, while network 100B is considered to be a UTMS network. However, it is noted that this example is not intended to be limiting, and the various method and apparatus embodiments disclosed herein may be used with other networks that support access barring.

In the example shown, a user of UE 106 may provide input that may generate an RRC connection request to the LTE network, network 100A through base station 102A of serving cell 108. For example, a user of UE 106 may wish to perform a query through the internet using a browser, wherein the internet connection may be provided through the LTE network. Responsive to initiating the action, UE 106 may send a request to the LTE network through base station 102A. In some cases, the LTE network may bar access to the LTE network by UE 106 through base station 102A of serving cell 108, as indicated by (1).

If UE 106 determines that access to the LTE network is barred through serving cell 108, it may perform actions to determine if another cell is available. In this example, base station 102B, which supports neighbor cell 109, is in close enough proximity to UE 106 such that cell reselection may be performed. Although normal cell reselection criteria has not necessarily been met in this instance, UE 106 may nevertheless force cell reselection to neighbor cell 109 responsive to determining that access to the LTE network is barred through serving cell 108, as in (2). Once cell reselection is complete, UE 106 may generate another RRC connection request to establish communication with the LTE network through base station 102B. Assuming LTE network access is granted to UE 106 through base station 102B, UE 106 may begin communications sooner that it might otherwise be able to if it were to wait for one of the timers discussed above to expire. Thus, the impact of access barring on user experience may be minimized by the forced cell reselection.

In the event that neighbor cell 109 is not available or within the vicinity of UE 106 to facilitate communications therebetween, or if LTE access is barred for that cell as well, UE 106 may scan for a RAT alternate (e.g., for a cell supporting UMTS in this particular example). If a UMTS cell is found, UE 106 may force a RAT reselection to UMTS. Following the RAT reselection UE 106 may initiate an RRC connection request to network 100B through alternate cell 111. Thus, RAT reselection performed by UE 106 may also be accompanied by cell reselection, in this case from serving cell 108 to alternate cell 111.

In some cases, LTE access may be barred in the serving cell, no alternate LTE cell that provides access is found, and a scan for cell supporting another RAT of UE 106 may result in no such cells being found or available. In such an instance, UE 106 may then honor the access barring and thus wait until the appropriate timer expires.

Figure 4:
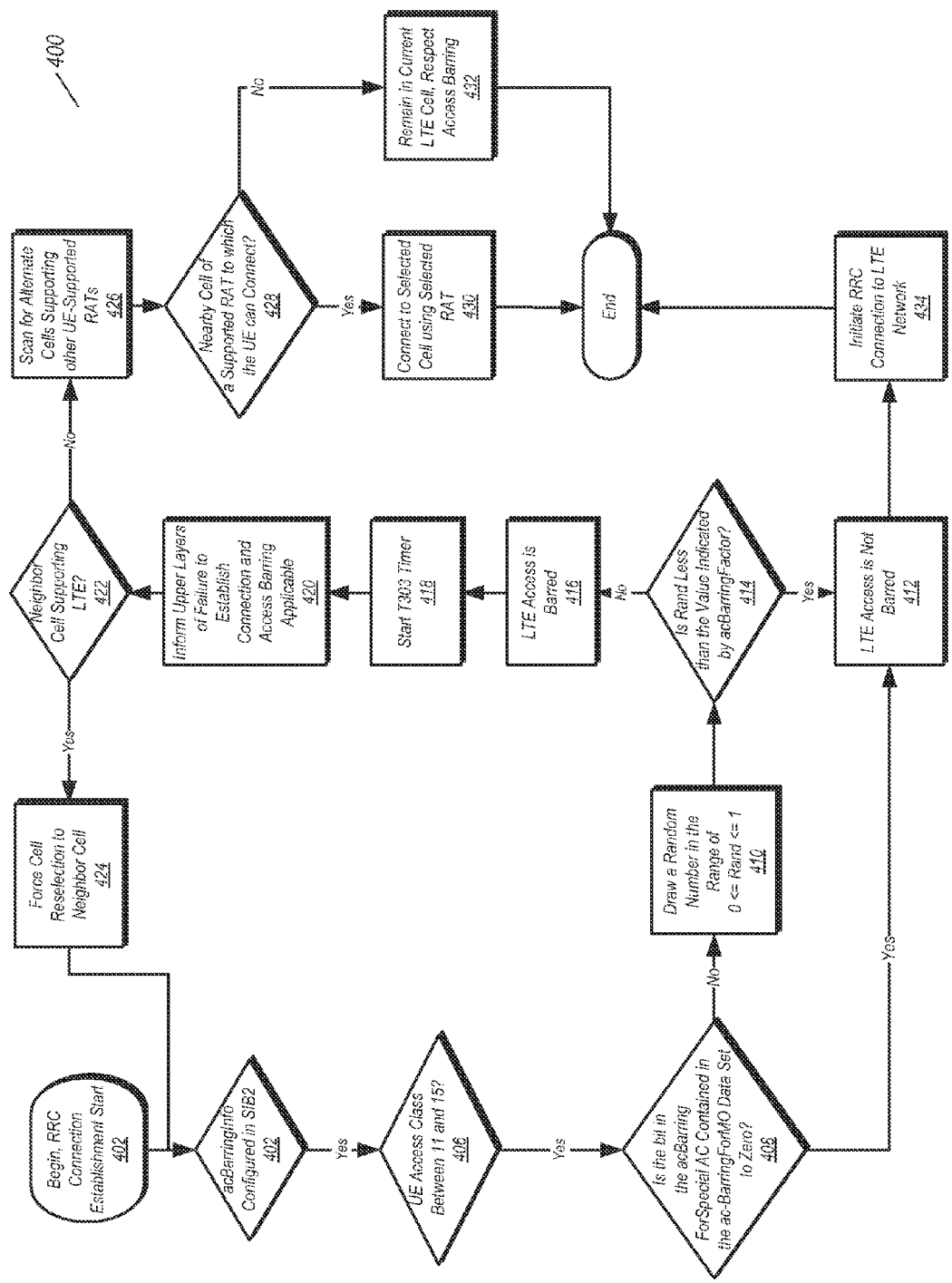
FIG. 4 is a flow diagram illustrating one embodiment of a method for forced cell/RAT reselection responsive to access barring by an LTE network.

Forced Cell/RAT Reselection Methodology:

FIG. 4 is a flow diagram further illustrating the methodology described herein. Method 400 may be performed using any of the apparatus embodiments discussed above, as well as with other apparatus embodiments not explicitly discussed herein.

Method 400 begins with the attempted RRC connection establishment of a UE to an LTE network (block 402). In block 404, it is determined if ac-BarringInfo is set in a system information block type 2 field. If ac-BarringInfo is not set (block 404, no), then the method proceeds to block 412 and thus access is not barred. Since access is not barred, the UE may initiate an RRC connection request with the LTE network through the serving cell (block 434).

If ac-BarringInfo is set (block 404, yes), then another check is performed to determine if the UE access class value is between 11 and 15. If the UE access class value is not between 11 and 15 (block 406, yes), and a bit in the ac-BarringForSpecialAC in ac-BarringForMO data is set to zero (block 408, yes), then access is not barred, and the UE may initiate an RRC connection request with the LTE network through the serving cell (block 434). If either of blocks 406 or 408 result in a 'no', then the method proceeds to block 410. In block 410, a random number 'rand' in the range of 0≤rand≤1 is drawn. If 'rand' is lower than the number indicated by ac-BarringFactor, then the method proceeds to blocks 412 and 434, as access is not barred and thus an RRC connection with the LTE network is initiated.

If 'rand' is not lower than the number indicated by ac-BarringFactor, then the method proceeds to block 416, as LTE access is barred. Upon determining that access is barred for the UE, a T303 timer begins tolling (block 418). The amount of time is calculated per the following formula: T303=(0.7+0.6*rand)*ac-BarringTime. Upper layers of the UE may then be informed that access to the LTE network through the serving cell is barred and that the RRC connection has not been established (block 420). A scan may then be performed to determine if there is a neighbor cell in the vicinity that supports LTE. If a neighbor LTE cell is found in close enough proximity to support communications with the UE (block 422, yes), then the UE may force cell reselection to that cell even if normal cell reselection criteria is not met (block 424). The method may then proceed to block 404, and a determination may be made as to whether access is barred at the new cell.

If no LTE cell is found within close enough proximity to the UE (block 422, no), then the UE may perform scanning for nearby cells supporting other RATs (block 426). If a nearby cell is found supporting another RAT that is also supported by the UE (block 428, yes), then a connection may be established with that cell. Otherwise, if no other cells supporting another RAT supported by the UE are found (block 428, no), then the UE may stay in the current cell and respect access barring (block 432). Once the timer expires, the UE may attempt another connection with the LTE network in the current cell.

While it is noted that specific network types (e.g., LTE and UMTS) have been mentioned in relation to the various embodiments discussed above, it is noted that the disclosure is not limited to these network types. Instead, the various method and apparatus embodiments may be applied to a wide variety of network types, including future standards not yet implemented or designed.

Figure 5:
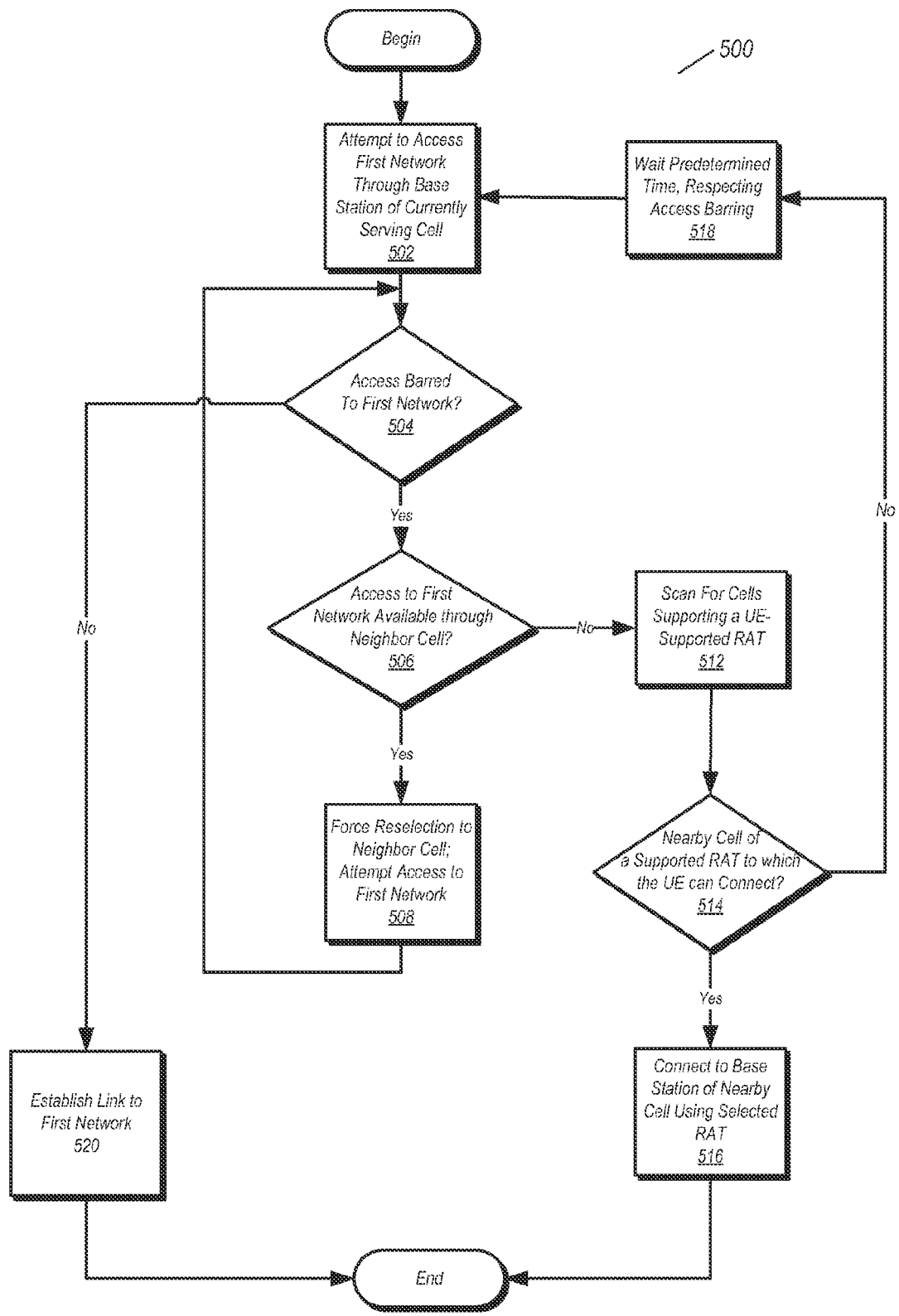
FIG. 5 is a flow diagram illustrating one embodiment of a method for forced cell/RAT reselection responsive to access barring by a first network.

FIG. 5 is a flow diagram illustrating one embodiment of a method for forced cell/RAT reselection responsive to access barring by a first network. While illustrated in FIG. 5 may apply to the LTE/UMTS embodiments discussed above, method 500 as illustrated herein is broadly applicable to instances in which at least one network to which access is attempted implements access barring, and in which a UE includes a RAT for each of two or more RANs. Such networks may include future networks that may implement access barring. Similarly, a UE utilizing method 500 may include a RAT corresponding to a future RAN for which access barring is to be implemented.

Method 500 begins with an attempt to access a first network through a base station of a serving cell (block 502). If access to the first network is not barred (block 504, no), then the RRC connection request sent by the UE may be accepted and a link may be established to the first network through the currently serving cell (block 520). If the UE determined that access is barred (block 504, yes), the UE may then search for any neighbor cells that also provide access to the same network. If such a neighbor cell is found (block 506, yes), then the UE may force reselection to that cell (block 508), even if cell reselection criteria has not otherwise been met. The UE may then attempt to access the network through the newly selected cell. If access is not barred (block 504, no), then a connection to the network is established through the base station of the new cell.

If access to the first network is barred through the base station of the currently serving cell (block 504, yes), and no other neighbor cells providing access to the first network are found (block 506, no), the UE may then scan for other cells through which a communications link may be established using a UE-supported RAT (block 512). If no other nearby cell (i.e. within communications range of the UE) is found that provides access to a second network via a UE-supported RAT (block 514, no), then the UE may stay in the same cell, respecting the access barring (block 518). After some amount of time has elapsed, the UE may again attempt to access the first network through the currently serving cell (block 502). If another nearby cell is found that provides access to a second network via a UE-supported RAT (block 514, yes), the UE may initiate a connection to the second network by establishing a wireless link to the base station of the nearby cell (block 516).

It is noted that while various hardware embodiments have been described above for performing the actions disclosed herein (e.g., forced cell reselection, RAT reselection, etc.), the various methodologies may also be implemented using software instructions stored on a non-transitory computer readable medium. For example, a Flash memory, an electrically erasable programmable read only memory (EEPROM), or other type of non-volatile memory could be used to store instructions that, when executed on a processor, cause a mobile device to determine if access is barred to a network through a given base station, including various actions taken to make such a determination (e.g., random number generation) and force cell reselection to another base station that also provides access to the same network. In general, it is possible and contemplated that any of the various cell/RAT reselection methodologies described above may be performed by the execution, by a processor, of software instructions stored on a non-transitory computer readable medium.

Numerous variations and modifications will become apparent to those skilled in the art once the above disclosure is fully appreciated. It is intended that the following claims be interpreted to embrace all such variations and modifications.

What is claimed is:

1. A wireless communication device comprising:
   a transceiver configured to transmit signals to and receive signals from a base station in a currently serving cell; and
   a baseband unit coupled to the transceiver, wherein responsive to determining that access to a first network is barred through the currently serving cell, the baseband unit is configured to force reselection to a neighbor cell through which the first network is accessible and further configured to cause the transceiver to attempt to establish a link with the first network through the neighbor cell;
   wherein the wireless communication device includes processing circuitry configured to generate a random number, wherein the baseband unit is configured to determine that access to the first network is barred through the currently serving cell based on a comparison of the random number to a barring factor number set by the first network at a base station of the currently serving cell.

2. The wireless communication device as recited in claim 1, wherein the baseband unit is configured to force reselection to the neighbor cell irrespective of whether cell reselection criteria has been met.

3. The wireless communication device as recited in claim 1, wherein the baseband unit is further configured:
to determine that access to the first network is barred through the neighbor cell;
responsive to determining that access to the first network is barred through the neighbor cell, to cause the transceiver to search for an alternate cell providing access to a second network is within communications range of the transceiver, wherein the second network is a radio access network (RAN) corresponding to a radio access technology supported by the wireless communication device; and
attempt to access the second network through the alternate cell.

4. The wireless communication device as recited in claim 3, wherein the baseband unit is further configured to cause the transceiver to re-attempt accessing the first network through the currently serving cell responsive to determining that access to the first network is barred through the serving cell and no alternate cell providing access to the second network is within communications range of the transceiver.

5. A wireless communication device comprising:
a transceiver configured to transmit signals to and receive signals from a base station in a currently serving cell of a network, wherein the transceiver is configured to access the network using a first radio access technology (RAT); and
a baseband unit coupled to the transceiver, wherein responsive to determining that access to the network is barred for the wireless communication device through the currently serving cell the baseband unit is configured to:
force reselection to a new cell responsive to determining that access to the new cell is available to provide access to the network; and
cause the transceiver to scan for alternate cells supporting a second RAT responsive to determining that no other cells are available for providing access to the network.

6. The wireless communication device as recited in claim 5, wherein the baseband unit is configured to determine that access to the network through the currently serving cell based on a comparison of a random number generated by processing circuitry coupled to the baseband unit and a barring factor number received from a base station of the currently serving cell indicating that the random number is larger than the barring factor number.

7. The wireless communication device as recited in claim 5, wherein the baseband unit is configured to ignore cell reselection criteria when forcing reselection to the new cell responsive to determining that access to the network is available through the new cell.

8. The wireless communication device as recited in claim 5, wherein the baseband unit is configured to force reselection from the first RAT to the second RAT responsive to determining that access to the network is barred through the currently serving cell and that no other cells are available for providing access to the network.

9. The wireless communication device as recited in claim 5, wherein the baseband unit is configured to force reselection from the first RAT to the second RAT responsive to determining that access to the network is barred through the currently serving cell and the new cell.

* * * * *